United States Patent
Miyamoto (10) Patent No.: US 8,493,016 B2
(45) Date of Patent: Jul. 23, 2013

(54) SEMICONDUCTOR CIRCUIT DEVICE INCLUDING SWITCHING ELEMENT

(75) Inventor: Noboru Miyamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 254 days.

(21) Appl. No.: 13/042,791

(22) Filed: Mar. 8, 2011

(65) Prior Publication Data

US 2011/0309776 A1 Dec. 22, 2011

(30) Foreign Application Priority Data

Jun. 18, 2010 (JP) ................................ 2010-138949

(51) Int. Cl.
*H02H 7/08* (2006.01)
*H02P 7/00* (2006.01)
*G05D 23/20* (2006.01)
*G05D 23/24* (2006.01)

(52) U.S. Cl.
USPC ........... 318/471; 318/472; 318/810; 318/798; 318/767; 318/494; 318/432; 318/434; 361/93.8; 361/93.7; 323/237; 323/271; 323/274

(58) Field of Classification Search
USPC ................. 318/800, 801, 471, 472, 445, 810, 318/798, 767, 494, 432, 434; 361/24, 203, 361/27, 717, 764, 783, 820, 93.7, 93.8; 323/349, 323/350, 290, 234, 237, 271, 274; 236/78, 236/94; 324/721, 537, 520, 522, 525, 526, 324/532, 535
See application file for complete search history.

(56) References Cited

U.S. PATENT DOCUMENTS

| | | | | |
|---|---|---|---|---|
| 6,377,428 B1 * | 4/2002 | Ogasawara | ..................... | 361/86 |
| 6,956,361 B1 * | 10/2005 | Mozipo et al. | ................ | 323/283 |
| 7,113,376 B2 * | 9/2006 | Nomura et al. | ................. | 361/31 |
| 7,120,037 B2 * | 10/2006 | Komatsu et al. | ................ | 363/37 |
| 7,622,887 B2 * | 11/2009 | Yoshimura | .................... | 318/810 |
| 7,940,034 B2 * | 5/2011 | Pelz et al. | ..................... | 323/284 |
| 7,965,527 B2 * | 6/2011 | Faccin | ....................... | 363/56.02 |
| 8,288,894 B2 * | 10/2012 | Yoshimura | .................... | 307/104 |
| 2004/0113744 A1 * | 6/2004 | Watanabe et al. | ............. | 336/233 |
| 2009/0314525 A1 * | 12/2009 | Kajino et al. | .................. | 174/255 |

FOREIGN PATENT DOCUMENTS

| | | |
|---|---|---|
| JP | 3-178565 | 8/1991 |
| JP | 8-182387 | 7/1996 |
| JP | 2001-284150 | 10/2001 |

(Continued)

OTHER PUBLICATIONS

Office Action issued Nov. 6, 2012 in Japanese Application No. 2010-138949 (With English Translation).

*Primary Examiner* — Rita Leykin
(74) *Attorney, Agent, or Firm* — Oblon, Spivak, McClelland, Maier & Neustadt, L.L.P.

(57) ABSTRACT

A semiconductor circuit device includes a semiconductor circuit including a switching element, a temperature monitoring unit, and a control unit. The temperature monitoring unit detects or estimates a temperature of a component connected to an inside or an outside of the semiconductor circuit. Here, the temperature of the component changes in accordance with a frequency of a current flowing through the component, and the frequency of the current flowing through the component changes in accordance with a switching frequency of the switching element. The control unit adjusts the switching frequency of the switching element such that the temperature of the component is equal to a target temperature.

7 Claims, 6 Drawing Sheets

FOREIGN PATENT DOCUMENTS

| | | |
|---|---|---|
| JP | 2004-166341 | 6/2004 |
| JP | 2005-198406 | 7/2005 |
| JP | 2007-49837 | 2/2007 |
| JP | 2008-124125 | 5/2008 |
| JP | 2009-159748 | 7/2009 |
| JP | 2010-35359 | 2/2010 |

* cited by examiner

SEMICONDUCTOR CIRCUIT DEVICE INCLUDING SWITCHING ELEMENT

BACKGROUND OF THE INVENTION

1. Field of the Invention

The present invention relates to a semiconductor circuit device including a switching element, and particularly to a semiconductor circuit device including a direct current (DC) to direct current (DC) conversion circuit or a direct current (DC) to alternating current (AC) conversion circuit using a switching element.

2. Description of the Background Art

In DC-DC conversion circuits (DC-DC converters) and DC-AC conversion circuits (inverter circuits), overheating due to switching loss in a semiconductor switching element often becomes problematic. As a method of suppressing overheating of a semiconductor switching element, for example, the following methods are known.

A method described in Japanese Patent Laying-Open No. 03-178565 is directed to an inverter device in which a switching element in an inverter main circuit is switched in response to a pulse width modulation signal having a given carrier frequency. The inverter device described in this document includes temperature detection means detecting a temperature of the switching element, comparison means comparing the temperature detected by the temperature detection means with a reference temperature, and correction means correcting the carrier frequency of the pulse width modulation signal based on an output signal from the comparison means.

Japanese Patent Laying-Open No. 2005-198406 discloses a boost device (boost chopper) capable of reducing switching loss. In the boost device, a gate resistance value of an IGBT is optimized in accordance with a boost voltage. Thereby, the switching loss can be reduced.

Similarly, in semiconductor integrated circuits, as a result of an increase in power consumption along with an improvement in the degree of integration, overheating and thermal runaway of an integrated circuit often become problematic. As a technique for reducing power consumption, for example, Japanese Patent Laying-Open No. 2008-124125 discloses a semiconductor integrated circuit device with a configuration described below. The semiconductor integrated circuit device includes a temperature sensor capable of detecting a temperature, determining, for each reference value, whether or not the detection result exceeds the reference value, and outputting a signal representing the determination result, and a control block capable of controlling an operation of a calculation block based on the output signal of the temperature sensor. The control block returns from a suspended state to an operation state by an interrupt signal based on the output signal of the temperature sensor, and determines an operation condition for the calculation block to satisfy a temperature condition for the calculation block.

In addition to a semiconductor switching element, overheating of a motor connected to an inverter circuit may become problematic. Japanese Patent Laying-Open No. 08-182387 discloses a method for suppressing temporary overheating of an AC motor without stopping an operation of the AC motor. According to the method, if a Central Processing Unit (CPU) detects that a temperature detected by a temperature detection element attached to a stator winding of the AC motor exceeds an upper set temperature, the CPU decreases an inverter output frequency by $\Delta f$ with an appropriate time gradient. If the detected temperature becomes not more than a lower set temperature, the CPU increases the inverter output frequency by $\Delta f$ with an appropriate time gradient.

In a Pulse Width Modulation (PWM) DC-DC converter, a higher switching frequency is preferable because ripples in an output are reduced and a coil (reactor) can be downsized. However, as the switching frequency is increased, high frequency loss in the coil is increased, and thus overheating due to the high frequency loss becomes problematic. Similarly, in a case where a motor is driven by a PWM inverter circuit, if a carrier frequency is increased, overheating of a stator winding due to high frequency loss becomes problematic.

As a method of suppressing overheating of a coil, a stator winding, and the like, it is contemplated to reduce an output voltage of a DC-DC converter, or to reduce an output voltage (current) or an output frequency of an inverter circuit. Although such a method is effective as a method of suppressing temporary overheating, it has a problem in a case where a device connected to a DC-DC converter or an inverter circuit is steadily operated. For example, in a system in which an inverter circuit is driven by an output of a DC-DC converter and a motor is driven by an output of the inverter circuit, overheating of a coil provided to the DC-DC converter can be suppressed by reducing an output voltage of the DC-DC converter. However, since it is necessary to increase an output current of the inverter circuit to maintain an output of the motor, overheating may occur in a stator winding of the motor.

SUMMARY OF THE INVENTION

One object of the present invention is to prevent overheating of a component connected to a semiconductor circuit including a switching element such as a DC-DC converter and an inverter circuit.

A semiconductor circuit device according to one aspect of the present invention includes a semiconductor circuit including a switching element, a temperature monitoring unit, and a control unit. The temperature monitoring unit detects or estimates a temperature of a component connected to an inside or an outside of the semiconductor circuit. Here, the temperature of the component changes in accordance with a frequency of a current flowing through the component, and the frequency of the current flowing through the component changes in accordance with a switching frequency of the switching element. The control unit adjusts the switching frequency of the switching element such that the temperature of the component is equal to a first target temperature.

Therefore, a main advantage of the present invention is that overheating of the component can be prevented by feedback-controlling the switching frequency of the switching element such that the temperature of the component is equal to the first target temperature.

The foregoing and other objects, features, aspects and advantages of the present invention will become apparent from the following detailed description of the present invention when taken in conjunction with the accompanying drawings.

DESCRIPTION OF THE PREFERRED EMBODIMENTS

Hereinafter, embodiments of the present invention will be described in detail with reference to the drawings. It is to be noted that identical or corresponding parts will be designated by the same reference numerals, and the description thereof will not be repeated

Embodiment 1

Figure 1:
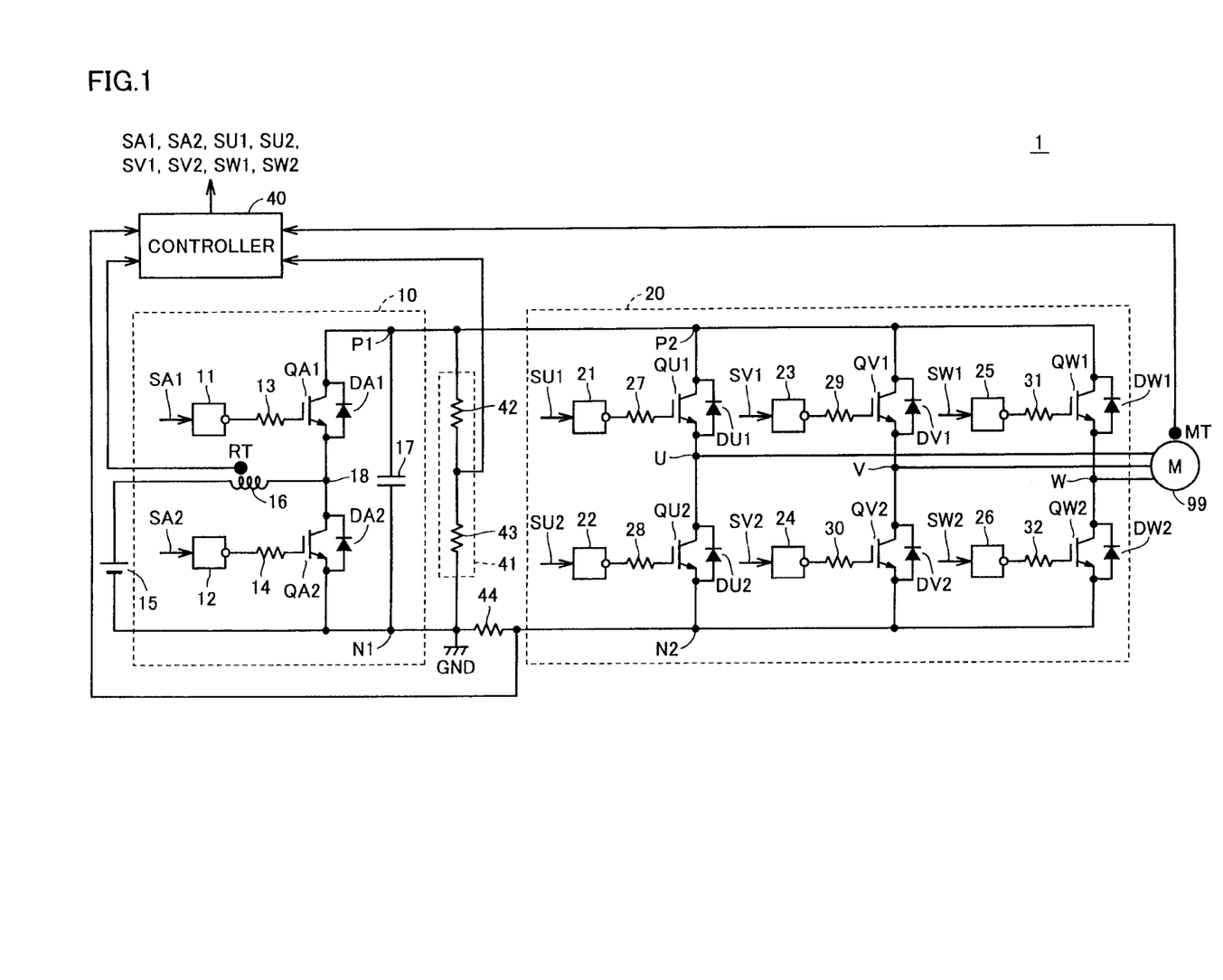
FIG. 1 is a block diagram showing a configuration of a semiconductor circuit device 1 according to Embodiment 1 of the present invention.

FIG. 1 is a block diagram showing a configuration of a semiconductor circuit device 1 according to Embodiment 1 of the present invention.

Referring to FIG. 1, semiconductor circuit device 1 includes a boost chopper 10 (DC-DC converter), an inverter circuit 20, a voltage detection unit 41, a current detection unit 44, temperature sensors RT, MT, and a controller 40. A motor 99 is connected to an output of inverter circuit 20.

Boost chopper 10 includes Insulated Gate Bipolar Transistors (IGBTs) QA1, QA2, diodes DA1, DA2, resistance elements 13, 14, gate drive circuits 11, 12, a reactor 16, and a capacitor 17. IGBTs QA1, QA2 are connected in series in this order between a positive-electrode-side node P1 and a negative-electrode-side node N1. Diodes DA1, DA2 are connected in parallel to IGBTs QA1, QA2, respectively, in a reverse bias direction. Gate drive circuit 11 is connected to a gate of IGBT QA1 via resistance element 13 (gate resistor). IGBT QA1 is controlled by a gate control signal SA1 to be always in an OFF state. Gate drive circuit 12 is connected to a gate of IGBT QA2 via resistance element 14, to switch IGBT QA2 in accordance with a gate control signal SA2. Reactor 16 has one end connected to a connection node 18 between IGBTs QA1 and QA2, and the other end to which a DC voltage is applied by a DC power source 15. Capacitor 17 is a smoothing capacitor connected between nodes P1 and N1.

An output voltage Vout of boost chopper 10 output from between nodes P1 and N1 is represented as follows, using a duty ratio $\alpha = Ton/Ts$:

$$Vout = Vin \times (Ton + Toff)/Toff \quad (1)$$
$$= Vin \times Ts/Toff$$
$$= Vin \times 1/(1-\alpha),$$

where Vin represents an input voltage from DC power source 15, Ton represents ON time of IGBT QA2, Toff represents OFF time of IGBT QA2, and Ts (an inverse of a switching frequency fs) represents a switching cycle of IGBT QA2.

Inverter circuit 20 is a PWM inverter converting DC power input from boost chopper 10 into three-phase AC power by the PWM method. Inverter circuit 20 includes IGBTs QU1, QU2, QV1, QV2, QW1, QW2, diodes DU1, DU2, DV1, DV2, DW1, DW2, resistance elements 27 to 32, and gate drive circuits 21 to 26. IGBTs QU1, QU2 (U phase arms) are connected in series in this order between a positive-electrode-side node P2 and a negative-electrode-side node N2. IGBTs QV1, QV2 (V phase arms) are connected in series in this order between positive-electrode-side node P2 and negative-electrode-side node N2, and connected in parallel to the U phase arms. IGBTs QW1, QW2 (W phase arms) are connected in series in this order between positive-electrode-side node P2 and negative-electrode-side node N2, and connected in parallel to the U phase and V phase arms. Diodes DU1, DU2, DV1, DV2, DW1, DW2 are connected in parallel to IGBTs QU1, QU2, QV1, QV2, QW1, QW2, respectively, in the reverse bias direction. Resistance elements 27 to 32 are gate resistors provided corresponding to IGBTs QU1, QU2, QV1, QV2, QW1, QW2, respectively. Gate drive circuits 21 to 26 are provided corresponding to IGBTs QU1, QU2, QV1, QV2, QW1, QW2, respectively, to switch the corresponding IGBTs in accordance with gate control signals SU1, SU2, SV1, SV2, SW1, SW2, respectively. Pseudo three-phase AC power generated from a connection node U between IGBTs QU1 and QU2, a connection node V between IGBTs QV1 and QV2, and a connection node W between IGBTs QW1 and QW2 by the PWM method is output to motor 99.

Voltage detection unit 41 includes resistance elements 42, 43 connected in series between nodes P1 and N1. Voltage detection unit 41 detects the voltage obtained by dividing the output voltage of boost chopper 10 by resistance elements 42, 43.

Current detection unit 44 is a shunt resistor connected between negative-electrode-side nodes N1 and N2, and an output current of inverter circuit 20 is monitored by detecting a voltage of the shunt resistor. Instead of the shunt resistor provided on an input side of inverter circuit 20, an instrument current transformer may be provided to each phase on an output side of inverter circuit 20.

Temperature sensor RT is attached to an insulator made of a synthetic resin for molding reactor 16 (coil) to monitor a temperature of the insulator made of the synthetic resin. As a switching frequency of IGBT QA2 is increased, a temperature of reactor 16 is increased by high frequency loss due to skin effect, proximity effect, eddy current loss, and the like. Deterioration of the synthetic resin for molding is suppressed by adjusting the switching frequency of IGBT QA2 such that the temperature of reactor 16 coincides with a target temperature, as described later.

Instead of a method of directly measuring the temperature with temperature sensor RT, the temperature of reactor 16 may be estimated based on a current flowing through reactor 16. In this case, the relationship among the current flowing through reactor 16, the switching frequency of IGBT QA2, and the temperature of reactor 16 is measured beforehand, and the temperature of reactor 16 is estimated based on the current flowing through reactor 16 actually measured and the switching frequency.

Temperature sensor MT is attached to an insulator made of a synthetic resin for molding a stator winding of motor 99 to monitor a temperature of the insulator made of the synthetic resin. As a frequency of a carrier wave used in PWM inverter circuit 20 is increased, a temperature of the stator winding is increased by high frequency loss due to skin effect, proximity effect, eddy current loss, and the like. Deterioration of the synthetic resin for molding is suppressed by adjusting switching frequencies of IGBTs QU1, QU2, QV1, QV2, QW1, QW2 such that the temperature of the stator winding of motor 99 coincides with a target temperature, as described later.

Controller 40 generates gate control signal SA2 based on output signals of voltage detection unit 41 and temperature sensor RT. Further, controller 40 generates gate control signals SU1, SU2, SV1, SV2, SW1, SW2 based on output signals of current detection unit 44 and temperature sensor MT. Hereinafter, an operation of controller 40 will be described in detail.

Figure 2:
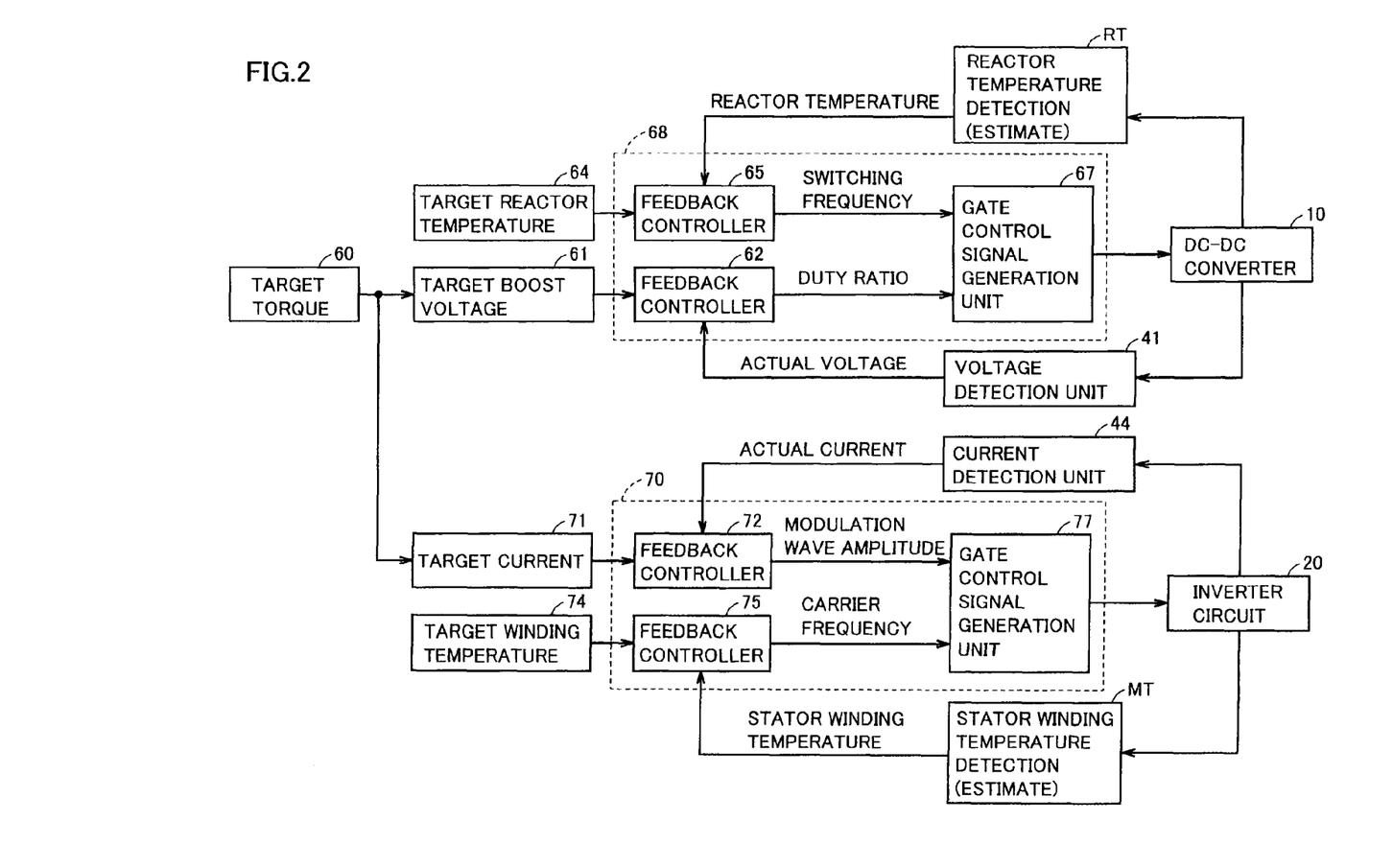
FIG. 2 is a block diagram showing an operation of a controller 40 in FIG. 1.

FIG. 2 is a block diagram showing an operation of controller 40 in FIG. 1.

Referring to FIGS. 1 and 2, controller 40 includes a control unit 68 controlling boost chopper 10 (DC-DC converter), and a control unit 70 controlling inverter circuit 20. Firstly, controller 40 determines a target boost voltage 61 and a target current 71 such that motor 99 generates a target torque 60, based on a table prepared beforehand. Target boost voltage 61 is used to control boost chopper 10, and target current 71 is used to control inverter circuit 20.

Control unit 68 controlling boost chopper 10 includes feedback controllers 62, 65, and a gate control signal generation unit 67. Feedback controller 62 determines a duty ratio of IGBT QA2 based on an actual voltage detected by voltage detection unit 41 in FIG. 1 and target boost voltage 61. Specifically, feedback controller 62 functions as a proportional (P) control system that determines the duty ratio by multiplying a difference between the actual voltage and target boost voltage 61 by a constant. Instead of the proportional control, proportional-integral (PI) control, proportional-integral-derivative (PID) control, or the like may be used.

Feedback controller 65 determines the switching frequency of IGBT QA2 based on the reactor temperature detected by temperature sensor RT in FIG. 1 and a preset target reactor temperature 64. Specifically, feedback controller 65 functions as a proportional (P) control system that determines the switching frequency by multiplying a difference between the detected reactor temperature and target reactor temperature 64 by a constant. Instead of the proportional control, PI control, PID control, or the like may be used.

Gate control signal generation unit 67 generates gate control signal SA2 based on the duty ratio and the switching frequency determined by feedback controllers 62, 65, respectively, and outputs gate control signal SA2 to gate drive circuit 12 for IGBT QA2. By repeating the feedback control described above, the actual voltage coincides with target boost voltage 61, and the detected reactor temperature coincides with target reactor temperature 64.

Control unit 70 controlling inverter circuit 20 includes feedback controllers 72, 75, and a gate control signal generation unit 77. Feedback controller 72 determines an amplitude of a modulation wave used for PWM control based on an actual current detected by current detection unit 44 and target current 71. Specifically, feedback controller 72 functions as a proportional (P) control system that determines the amplitude of the modulation wave by multiplying a difference between the actual current and target current 71 by a constant. Instead of the P control, proportional-integral (PI) control, proportional-integral-derivative (PID) control, or the like may be used.

Feedback controller 75 determines the frequency of the carrier wave (the switching frequencies of the IGBTs) used for PWM control based on the stator winding temperature detected by temperature sensor MT and a preset target winding temperature 74. Specifically, feedback controller 75 functions as a proportional (P) control system that determines the carrier frequency by multiplying a difference between the detected winding temperature and target winding temperature 74 by a constant. Instead of the P control, PI control, PID control, or the like may be used.

Gate control signal generation unit 77 generates gate control signals SU1, SU2, SV1, SV2, SW1, SW2 based on the modulation wave amplitude and the carrier frequency determined by feedback controllers 72, 75, respectively, and outputs the signals to gate drive circuits 21 to 26 for IGBTs QU1, QU2, QV1, QV2, QW1, QW2. By repeating the feedback control described above, the actual current coincides with target current 71, and the detected stator winding temperature coincides with target winding temperature 74.

As described above, according to semiconductor circuit device 1 of Embodiment 1, control can be performed to cause motor 99 to rotate with a desired torque and cause the temperature of reactor 16 and the temperature of the stator winding of motor 99 to coincide with respective predetermined target temperatures. As a result, overheating of these components can be prevented.

Target reactor temperature 64 and target winding temperature 74 are each set to an appropriate value beforehand through experiments and the like. Since switching loss of an IGBT increases with an increase in a switching frequency, it is necessary to set the target temperatures of reactor 16 and the stator winding of motor 99 such that the IGBTs have temperatures within an allowable range. Thereby, if the temperatures of reactor 16 and the stator winding of motor 99 are feedback-controlled to coincide with the target temperatures, the IGBTs can also have temperatures within the allowable range.

Set values for target reactor temperature 64 and target winding temperature 74 may be fixed, or changed in accordance with accumulated energization time for reactor 16 and motor 99, as described below.

Figure 3:
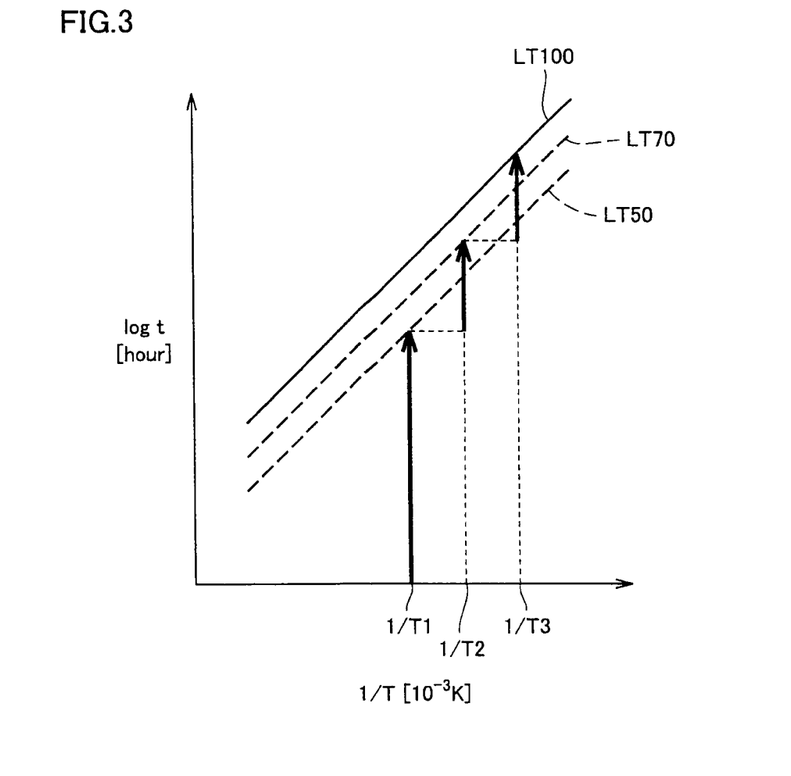
FIG. 3 is a view of a temperature versus life line of a synthetic resin used to mold a reactor 16.

FIG. 3 is a view of a temperature versus life line of the synthetic resin used to mold reactor 16. Hereinafter, a method of setting the target temperature of reactor 16 will be described with reference to FIG. 3. The same applies to a method of setting the target temperature of the stator winding of motor 99.

Generally, a synthetic resin gradually undergoes a chemical reaction due to ultraviolet rays, moisture, and the like, and is deteriorated. If it is assumed that the chemical reaction follows the Arrhenius reaction rate theory, the synthetic resin has a life proportional to an inverse of an absolute temperature. Specifically, in a case where the axis of ordinates represents a logarithm of time for which the synthetic resin is used, and the axis of abscissas represents an inverse of an absolute temperature at which the synthetic resin is used as shown in FIG. 3, the life of the synthetic resin is represented by a straight line LT100 determined depending on a synthetic resin material. FIG. 3 also shows a straight line LT70 corresponding to 70% of the life, and a straight line LT50 corresponding to 50% of the life.

The target temperature is set utilizing the temperature versus life line. Specifically, controller 40 in FIG. 1 controls boost chopper 10 using a temperature T1 as an initial set value for the target temperature of reactor 16. If the accumulated energization time for reactor 16 reaches 50% of the life of the synthetic resin for molding, controller 40 changes the target temperature to T2 lower than T1. Then, if the accumulated energization time for reactor 16 reaches 70% of the life of the synthetic resin, controller 40 changes the target temperature to T3 lower than T2. Thus, a life of reactor 16 can be extended by changing the target temperature in accordance with the accumulated energization time as described above.

Although the above description has exemplified a boost chopper as a DC-DC converter, it is needless to say that the type of the DC-DC converter is not limited thereto. The present invention is applicable to non-insulation type DC-DC converters such as a buck chopper and a buck-boost chopper, and insulation type DC-DC converters such as a flyback converter. Although the above description has exemplified an IGBT as a semiconductor switching element, the type of the semiconductor switching element is not limited thereto. Other semiconductor switching elements such as a metal-oxide semiconductor field-effect transistor (MOSFET) and a bipolar transistor can be used.

Embodiment 2

A semiconductor circuit device 2 according to Embodiment 2 controls the temperature of reactor 16 and the temperature of the stator winding of motor 99 to coincide with the respective target temperatures, and controls temperatures of semiconductor chips on which the IGBTs are formed to coincide with a target temperature.

Figure 4:
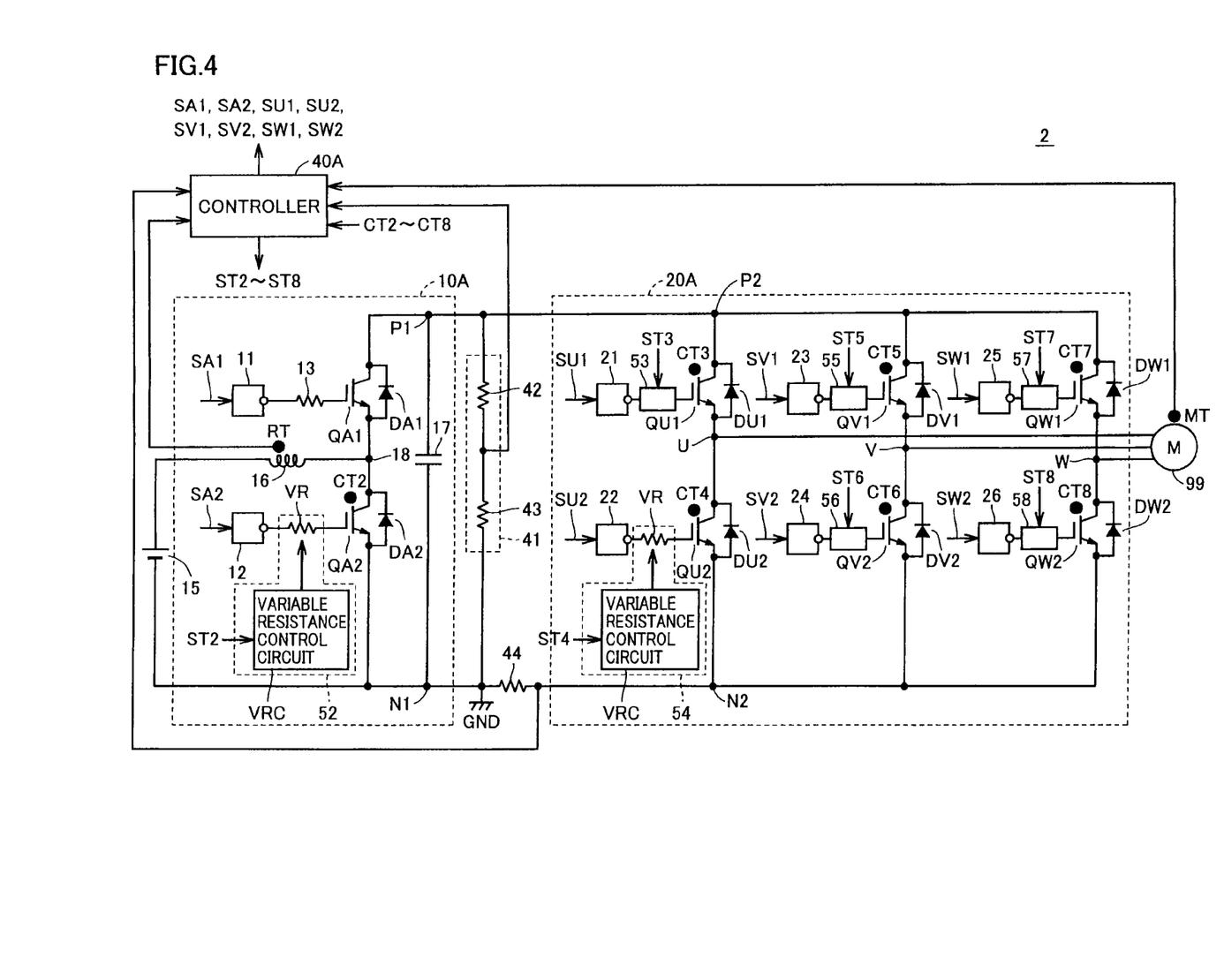
FIG. 4 is a block diagram showing a configuration of a semiconductor circuit device 2 according to Embodiment 2 of the present invention.

FIG. 4 is a block diagram showing a configuration of semiconductor circuit device 2 according to Embodiment 2 of the present invention. A boost chopper 10A in FIG. 4 is different from boost chopper 10 in FIG. 1 in that it includes a switching time adjusting unit 52 instead of resistance element 14 connected to the gate of IGBT QA2. An inverter circuit 20A in FIG. 4 is different from inverter circuit 20 in FIG. 1 in that it includes switching time adjusting units 53 to 58 instead of resistance elements 27 to 32 connected to gates of IGBTs QU1, QU2, QV1, QV2, QW1, QW2, respectively. Each of switching time adjusting units 52 to 58 includes a variable resistance element VR used as a gate resistor for the corresponding IGBT, and a variable resistance control circuit VRC controlling a resistance value of variable resistance element VR.

Semiconductor circuit device 2 of FIG. 4 further includes temperature sensors CT2 to CT8 detecting the temperatures of the semiconductor chips on which IGBTs QA2, QU1, QU2, QV1, QV2, QW1, QW2 are formed, respectively. Instead of a method of directly measuring chip temperatures with temperature sensors CT2 to CT8, the temperatures of the IGBTs may be estimated based on collector currents, collector voltages, switching frequencies, and the like of the IGBTs.

Controller 40A generates resistance control signals (instruction signals) ST2 to ST8 based on outputs of temperature sensors CT2 to CT8, and outputs the generated resistance control signals ST2 to ST8 to variable resistance control circuits VRCs provided in switching time adjusting units 52 to 58. Since other components in FIG. 4 are identical to those in FIG. 1, identical or corresponding parts will be designated by the same reference numerals, and the description will not be repeated.

Figure 5:
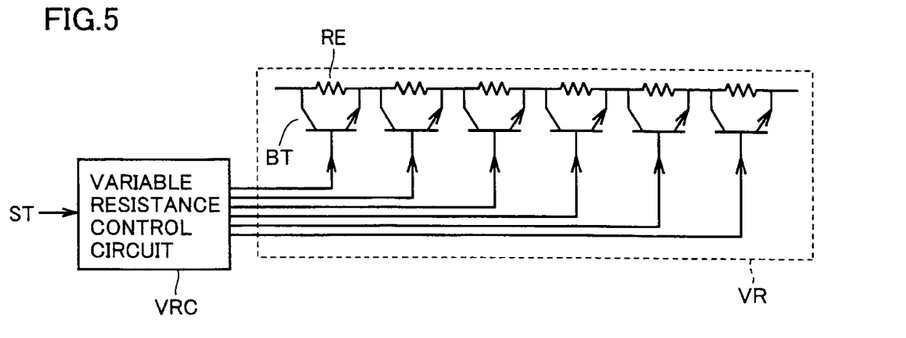
FIG. 5 is a circuit diagram showing an exemplary configuration of a variable resistance element VR in FIG. 4.

FIG. 5 is a circuit diagram showing an exemplary configuration of variable resistance element VR in FIG. 4. Referring to FIG. 5, variable resistance element VR includes a plurality of resistance elements RE connected in cascade, and a plurality of bipolar transistors BT connected in parallel to the plurality of resistance elements RE, respectively. Variable resistance control circuit VRC controls each bipolar transistor BT to be in an ON state or an OFF state in accordance with a resistance control signal ST from controller 40A. Thereby, the resistance value of variable resistance element VR, that is, a gate resistance value of an IGBT, can be changed.

Switching time of an IGBT (time in which the IGBT changes from an ON state to an OFF state, or time in which the IGBT changes from an OFF state to an ON state) is proportional to the product of a gate resistance value and an input capacitance. Here, the input capacitance is represented by the sum of a capacitance between a gate and a collector and a capacitance between the gate and an emitter of the IGBT. Therefore, the switching time can be changed by changing the gate resistance value of the IGBT. Since the change in the switching time of the IGBT causes a change in switching loss, a temperature of an IGBT chip can be changed.

Specifically, if the switching time of the IGBT is increased, the switching loss is increased, and thus the temperature of the IGBT chip is increased. If the switching time of the IGBT is decreased, the switching loss is decreased, and thus the temperature of the IGBT chip is decreased. However, since a surge voltage caused when the IGBT is turned on is increased with a decrease in the switching time, that is, a decrease in the gate resistance value, it is necessary to change the gate resistance value in a range in which the surge voltage does not exceed a withstand voltage of the IGBT. Hereinafter, a specific operation of controller 40A will be described.

Figure 6:
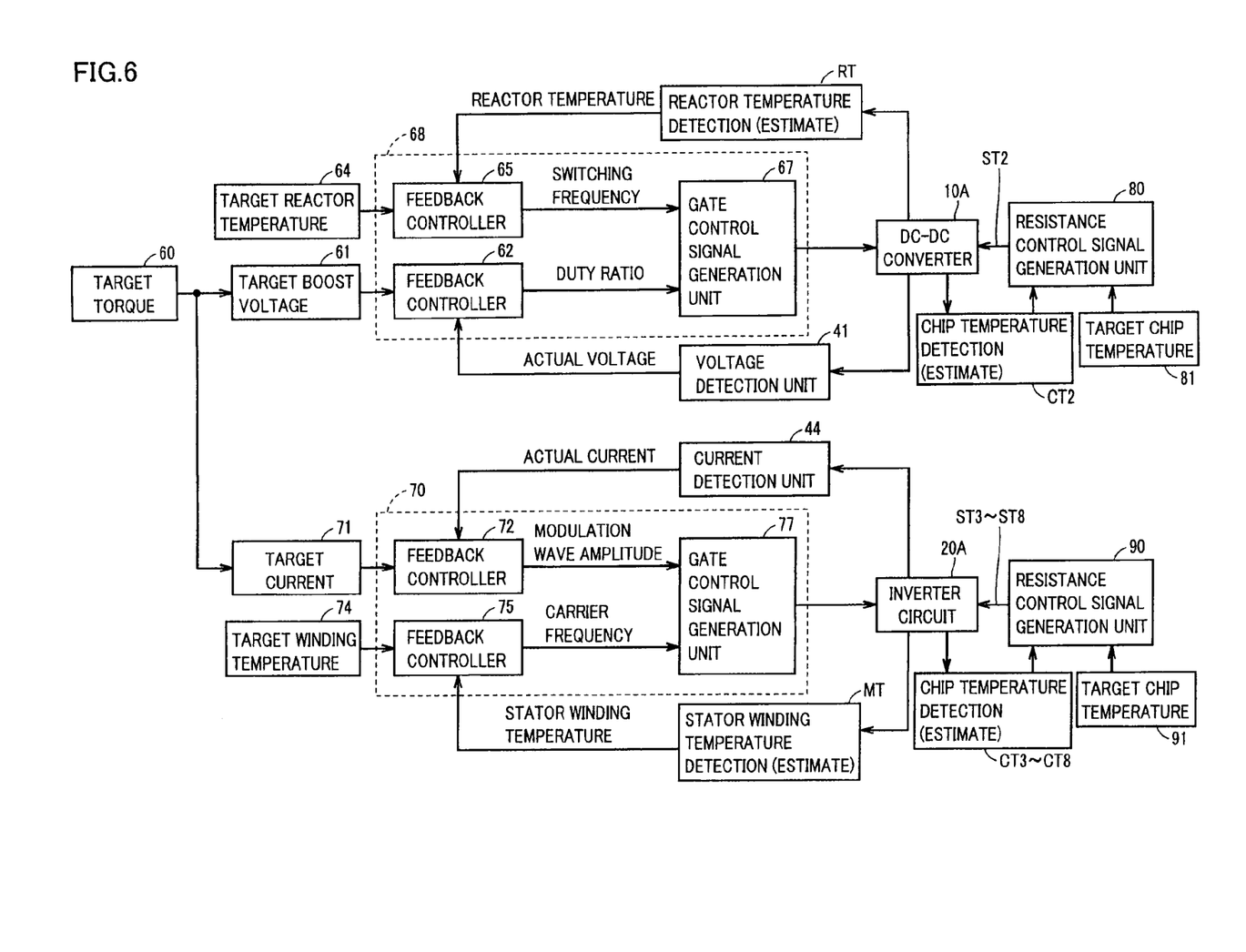
FIG. 6 is a block diagram showing an operation of a controller 40A in FIG. 4.

FIG. 6 is a block diagram showing an operation of controller 40A in FIG. 4.

Referring to FIGS. 4 and 6, controller 40A further includes resistance control signal generation units 80, 90 in addition to control units 68, 70 described in FIG. 2. Since the operations of control units 68, 70 are identical to those in FIG. 2, the description will not be repeated.

Resistance control signal generation unit 80 generates resistance control signal ST2 based on a preset target chip temperature 81 and a chip temperature of IGBT QA2 in boost chopper 10A detected by temperature sensor CT2. Specifically, resistance control signal generation unit 80 performs proportional (P) control multiplying a difference between the detected chip temperature and target chip temperature 81 by a constant. Instead of the proportional control, PI control, PID control, or the like may be used. Resistance control signal generation unit 80 outputs the resistance control signal ST2 generated by the above proportional control to variable resistance control circuit VRC in switching time adjusting unit 52. Variable resistance control circuit VRC changes a gate resistance value of IGBT QA2 (a resistance value of variable resistance element VR) in accordance with resistance control signal ST2. By repeating the feedback control described above, the detected chip temperature substantially coincides with target chip temperature 81.

Resistance control signal generation unit 90 generates resistance control signals ST3 to ST8 based on a preset target chip temperature 91 and chip temperatures of IGBTs QU1, QU2, QV1, QV2, QW1, QW2 in inverter circuit 20A detected by temperature sensors CT3 to CT8. Specifically, resistance control signal generation unit 90 performs proportional (P) control multiplying a difference between each of the detected chip temperatures and target chip temperature 91 by a constant. Instead of the P control, PI control, PID control, or the like may be used. Resistance control signal generation unit 90 outputs the resistance control signals ST3 to ST8 generated by the above proportional control to variable resistance control circuits VRCs in switching time adjusting units 53 to 58. Each variable resistance control circuit VRC changes a gate resistance value of a corresponding IGBT (a resistance value of variable resistance element VR) in accordance with a corresponding resistance control signal of resistance control signals ST3 to ST8. By repeating the feedback control described above, each of the detected chip temperatures substantially coincides with target chip temperature 91.

As described above, according to semiconductor circuit device 2 of Embodiment 2, the temperature of each IGBT chip can be controlled to coincide with a predetermined target temperature in a state where control is performed to cause motor 99 to rotate with a desired torque and cause the temperature of reactor 16 and the temperature of the stator winding of motor 99 to coincide with respective predetermined target temperatures. As a result, overheating of reactor 16, the stator winding of motor 99, and each IGBT chip can be prevented.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A semiconductor circuit device, comprising:
   a semiconductor circuit including a switching element;
   a component temperature monitoring unit detecting or estimating a temperature of a component connected to an inside or an outside of said semiconductor circuit, the temperature of said component changing in accordance with a frequency of a current flowing through said component, the frequency of the current flowing through said component changing in accordance with a switching frequency of said switching element;
   a detection unit detecting an output voltage or an output current of the semiconductor circuit; and
   a control unit controlling a gate control signal driving said switching element by determining the switching frequency of the switching element such that the temperature of said component is equal to a first target temperature, wherein
   when the detection unit detects an output voltage of the semiconductor circuit, the control unit controls the gate control signal driving the switching element by determining a duty ratio of the switching element such that the detected output voltage of the semiconductor circuit is equal to a target voltage, and
   when the detection unit detects an output current of the semiconductor circuit, the control unit controls the gate control signal driving the switching element by determining a modulation wave amplitude of the semiconductor circuit such that the detected output current of the semiconductor circuit is equal to a target current.

2. The semiconductor circuit device according to claim 1, wherein
   said component is molded with an insulator made of a synthetic resin, and
   said control unit monitors accumulated energization time for said component that has elapsed since said first target temperature was set to an initial value, and, when said accumulated energization time exceeds a time determined depending on a synthetic resin material of the insulator for molding said component, said control unit changes said first target temperature to a temperature lower than said initial value.

3. The semiconductor circuit device according to claim 1, further comprising:
   an element temperature monitoring unit detecting or estimating a temperature of said switching element; and
   a switching time adjusting unit adjusting switching time of said switching element, wherein
   said control unit further instructs said switching time adjusting unit to adjust the switching time of said switching element such that the temperature of said switching element is equal to a second target temperature.

4. The semiconductor circuit device according to claim 1, wherein said semiconductor circuit is a pulse width modulation DC-DC conversion circuit including a reactor as said component and converting input DC power into DC power having a magnitude in accordance with a switching operation of said switching element.

5. The semiconductor circuit device according to claim 1, wherein said semiconductor circuit is a pulse width modulation DC-AC conversion circuit converting input DC power into AC power having a magnitude in accordance with a switching operation of said switching element, and outputting the AC power to a motor winding as said component.

6. A semiconductor circuit device, comprising:
   a pulse width modulation DC-DC conversion circuit including a first switching element and a reactor connected to said first switching element, converting input DC power into DC power having a magnitude in accordance with a switching operation of said first switching element, and outputting the converted DC power;
   a pulse width modulation DC-AC conversion circuit including a second switching element, converting the DC power output from said DC-DC conversion circuit into AC power having a magnitude in accordance with a switching operation of said second switching element, and outputting the AC power to a motor winding;
   a first component temperature monitoring unit detecting or estimating a temperature of said reactor;
   a second component temperature monitoring unit detecting or estimating a temperature of said motor winding;
   a voltage detection unit detecting an output voltage of the pulse width modulation DC-DC conversion circuit,
   a current detection unit detecting an output current of the pulse width modulation DC-AC conversion circuit; and
   a control unit controlling a gate control signal driving said first switching element by determining a switching frequency of the first switching element such that the temperature of said reactor is equal to a first target temperature and by determining a duty ratio of the first switching element such that the detected output voltage of the pulse width modulation DC-DC conversion circuit is equal to a target voltage, and controlling a gate control signal driving said second switching element by determining a switching frequency of the second switching element such that the temperature of said motor winding is equal to a second target temperature and by determining a modulation wave amplitude of the pulse width modulation DC-AC conversion circuit such that the detected output current of the pulse width modulation DC-AC conversion circuit is equal to a target current.

7. The semiconductor circuit device according to claim 6, further comprising:
   a first element temperature monitoring unit detecting or estimating a temperature of said first switching element;
   a second element temperature monitoring unit detecting or estimating a temperature of said second switching element;
   a first switching time adjusting unit adjusting switching time of said first switching element; and
   a second switching time adjusting unit adjusting switching time of said second switching element, wherein
   said control unit further instructs said first switching time adjusting unit to adjust the switching time of said first switching element such that the temperature of said first switching element is equal to a third target temperature, and instructs said second switching time adjusting unit to adjust the switching time of said second switching element such that the temperature of said second switching element is equal to a fourth target temperature.

* * * * *